W. F. GEORGE.
Apparatus for Milking Cows.
No. 204,314. Patented May 28, 1878.
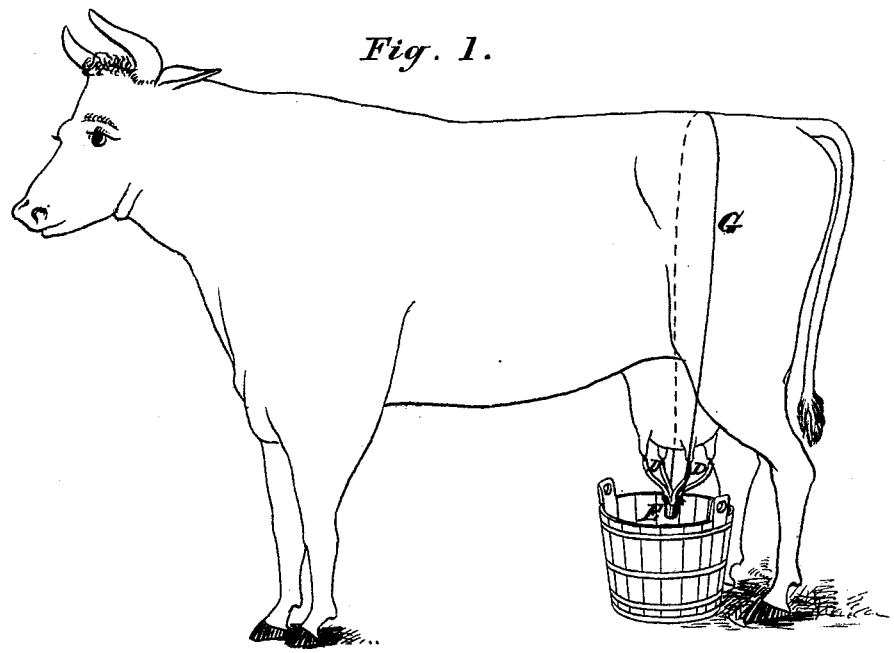
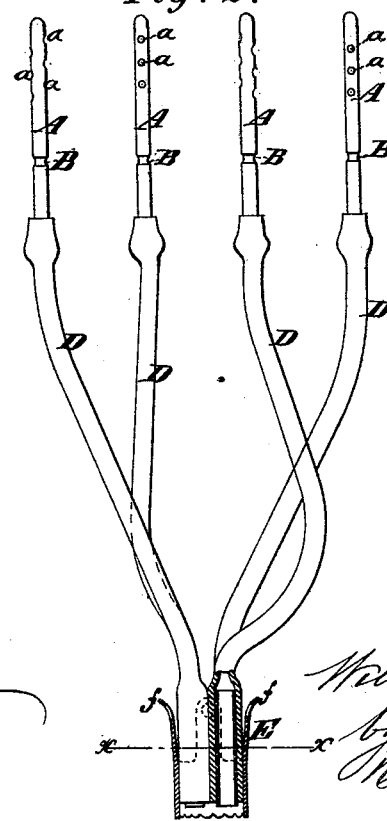

UNITED STATES PATENT OFFICE.

WILLIAM F. GEORGE, OF NEW YORK, N. Y., ASSIGNOR OF ONE-HALF HIS RIGHT TO SELF ACTING COW MILKER MANUFACTURING COMPANY.

IMPROVEMENT IN APPARATUS FOR MILKING COWS.

Specification forming part of Letters Patent No. 204,314, dated May 28, 1878; application filed April 27, 1878.

*To all whom it may concern:*

Be it known that I, WILLIAM F. GEORGE, of the city and State of New York, have invented an Improvement in Apparatus for Milking Cows and other Animals; and I do hereby declare that the following is a full, clear, and exact description of the same, reference being had to the accompanying drawing, forming a part of this specification.

My invention relates to that class of milking apparatus in which tubes are inserted into the teats of animals for the purpose of drawing off the milk from their udders.

The invention consists in the novel construction of the teat-tubes, whereby they are more firmly held in the teats of animals, and whereby the milk is also caused to flow faster than it otherwise would, without unduly and injuriously stretching the teats.

The invention also consists in novel means for preventing the detachment of the apparatus by the restive movements of an unruly animal.

The apparatus is chiefly designed for use in milking cows, and it is shown in the drawing as so applied. It will be sufficiently illustrated by describing it as used for milking cows.

Figure 1 in the drawing represents the apparatus as applied to milking a cow. Fig. 2 is partly a side view and partly a sectional view of the apparatus detached from the cow. Fig. 3 is a longitudinal section of one of the teat-tubes. Fig. 4 is a cross-section on the line $x\ x$ in Fig. 2.

The most important feature of my invention is a novel construction of the teat-tubes, by which I am able to obtain a firmer hold in the teat upon such tubes, whereby I obtain a more rapid flow of milk, and whereby the said tubes do not unduly stretch the said mouths, as is the case with tubes as hitherto employed.

The teat-tubes are represented at A in the drawing. They are made of metal, or any other material that will not corrode and which may receive a high polish. Their ends which penetrate into the teats are preferably closed, and apertures $a$ are made in the sides of the tubes, near the closed ends thereof, to permit the milk to flow from the udder through the said tubes.

About one inch (more or less) from the ends of the said tubes I form in each of the same a groove or depression, B, the purpose of which is an important object of my invention.

The use of tubes as heretofore constructed for milking by the insertion of the same into the teats of cows has been apt, by keeping the mouths of the teats too long and too largely on the stretch, to generate a habit in some cows of discharging their milk spontaneously and without the insertion of the tubes when their udders are full. Such tubes, as heretofore constructed, have been, in some cases, supplied with bulbs to enter the teats of the cows, in the anticipation that the said tubes would be more tightly held in the teats; but as this construction fails to secure a firmer hold without unduly stretching the teats, it aggravates the difficulty above set forth.

This difficulty is avoided by my invention, while at the same time I secure a far firmer hold of the teats upon the tubes. The said tubes are inserted to such a distance in the teats that the rim of the mouth of each teat enters into the middle of the said groove. The contraction of the mouth of the teat, or its sphincter-like action, then operates to press the tube toward the udder rather than to push it out of the teat, as is the case when the tube has no such groove or depression. In other words, the groove or depression B may be considered as forming a neck, which the mouth of the teat grasps without such distension as to weaken the sphincter-like action of the mouth.

Another improvement in the form of teat-tubes consists in making the end of each of said tubes to which the flexible tubes are attached interiorly flaring, as shown at C, Fig. 3. This construction not only gives a firmer attachment to the tubes D, but, according to a well-known law of liquid-discharge through ajutages, gives a more rapid flow than could be obtained with a tube having the same interior diameter through its entire extent.

Another difficulty that has been experienced with apparatus of this kind is that, with restive or unruly cows, the apparatus is likely to be detached, and loss of time and loss of milk results, the latter loss being considerable when the apparatus has to be frequently replaced. I remedy this difficulty by forming upon a band or clasp which holds the ends of the tubes D together one or more eyelets or other suitable attaching devices, to which a cord, strap, string, or wire may be attached and passed over the hips of the animal, for sustaining the principal part of the weight of the tubes D and their contents. The said cord, strap, string, or wire supporter is shown at G, Fig. 1, and the method of its application will be obvious from that figure.

I do not claim, broadly, the use of teat-tubes for drawing the milk from the udder of a cow or other animal, nor the combination of flexible tubes with teat-tubes, nor the combination, with the teat-tubes and flexible tubes, of a common nozzle for the discharge of the milk; but What I consider as my invention, and desire to secure by Letters Patent, is set forth in the following claims:

1. In a milking apparatus, one or more teat-tubes, each having a groove, depression, or neck, B, substantially as and for the purpose specified.

2. In a milking apparatus, a teat tube or tubes having the interiorly-flaring end or ends C for increasing the flow of the milk without unduly stretching the teat or teats, substantially as and for the purpose specified.

3. A teat-tube having both a neck, B, and an interiorly-flaring end, substantially as and for the purposes described.

4. The combination, with an embracing band or nozzle, E, for holding together the lower ends of the flexible tube D, of a flexible supporter, G, for sustaining the weight of the said tubes and nozzle and their contained milk, substantially as and for the purpose set forth.

WM. F. GEORGE.

Witnesses:
  HENRY T. BROWN,
  FRED. HAYNES.